(12) United States Patent
Harding et al.

(10) Patent No.: US 6,399,525 B2
(45) Date of Patent: *Jun. 4, 2002

(54) FLAME ATTENUATED FIBERGLASS

(75) Inventors: Foster Laverne Harding; Jon Frederick Bauer, both of Castle Rock; Harry Hand Russell, III, Evergreen; Xiaojie Xu, Littleton, all of CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/902,590

(22) Filed: Jul. 12, 2001

Related U.S. Application Data

(63) Continuation of application No. 09/313,635, filed on May 18, 1999, now abandoned, which is a continuation-in-part of application No. 08/827,571, filed on Mar. 28, 1997, now Pat. No. 5,945,360.

(51) Int. Cl.$^7$ ................................................ C03C 13/00
(52) U.S. Cl. ........................................... 501/35; 501/36
(58) Field of Search ...................................... 501/35, 36

(56) References Cited

U.S. PATENT DOCUMENTS

| | | | | |
|---|---|---|---|---|
| 5,108,957 A | * | 4/1992 | Cohen et al. | ................. 501/35 |
| 5,401,693 A | * | 3/1995 | Bauer et al. | ................. 401/38 |

* cited by examiner

*Primary Examiner*—Karl Group
(74) *Attorney, Agent, or Firm*—Robert D. Touslee

(57) ABSTRACT

Glass fibers prepared by flame attenuation display excellent chemical resistance to both acids and moisture while being highly biosoluble at the same time. The glass compositions are characterized by ratios of components which are reflective of acid resistance, biosolubility, and moisture resistance. Preferred glass fibers exhibit a biodissolution greater than about 350 ng/cm$^2$hr.

31 Claims, No Drawings

FLAME ATTENUATED FIBERGLASS

RELATED APPLICATIONS

This application is a continuation of application Ser. No. 09/313,635, filed on May 18, 1999, now abandoned; which in turn is a continuation-in-part of U.S. Ser. No. 08/827,571, filed Mar. 28, 1997, now U.S. Pat. No. 5,945,360.

BACKGROUND OF THE INVENTION

1. Technical Field

The present invention pertains to fiberglass products prepared from glass compositions suitable for a process involving flame attenuation. The glass fibers exhibit good biosolubility and excellent moisture resistance.

2. Description of the Related Art

Fiberglass has a myriad of uses, including the reinforcement of polymer matrix composites; preparation of thermoformable intermediate products for use as headliners and hoodliners in vehicles; air and water filtration media; and sound and thermal insulation products. The preparation and/or subsequent processing of such materials often involves handling steps which result in cut or broken fibers which may be inhaled. As it is impractical or impossible to remove such fibers from the body, it has become important to create glass compositions which exhibit high degrees of biosolubility, i.e. which are rapidly solubilized in biological fluids.

If high biosolubility were the only factor which need be considered, a solution to the biosolubility problem would be rapidly attained. However, in addition to being biosoluble, glass fibers must also possess a number of other physical and chemical characteristics. For example, in many applications such as in battery separators, high chemical (e.g. acid) resistance is required. As can be readily imagined, high chemical resistance and high biosolubility are largely conflicting characteristics.

Glass fibers must also be strong and moisture-resistant. If moisture weakens glass fibers appreciably, their applicability to many uses suffers. Weakened glass fibers not only possess less than desired tensile strength and modulus, but also break and fracture more easily, thus increasing the risk of inhalation, etc. By the same token, moisture resistant glass fibers which have low strength to begin with also do not fulfill many requirements. For example, building insulation is shipped in compressed form. If the glass fibers of the insulation product are weak or brittle, many fibers will be broken during compression, not only increasing the number of small fibers which are bioavailable, but also producing an inferior product which may not recover a sufficient amount of its pre-compressed thickness. Strong fibers which are not moisture resistant also exhibit a great deal of breakage, especially under humid storage, as illustrated hereinafter. Finally, glass fibers must be prepared from glass compositions which can be economically processed.

The two principle methods of glass wool fiber production are the pot and marble process and the centrifugal or "rotary" process. In the latter, molten glass enters a centrifugal spinner from the forehearth of a glass melting furnace. As the centrifugal spinner rotates, relatively large diameter glass strands stream from orifices located in the spinner's periphery. These large diameter strands immediately contact an intense hot gas jet produced by burners located around the spinner. The hot gas attenuates the large diameter strands into fine, elongated fibers, which may be collected on a moving belt.

The primaries exiting the pot from the pot and marble process are flame attenuated rather than hot gas attenuated, thus exposing the glass fibers to higher temperatures than in the rotary process. These higher temperatures cause a loss of the more volatile compounds of the glass composition from the outside of the fibers, resulting in a "shell" which has a different composition than the fiber interior. As a result, the biosolubility of glass fibers prepared from pot and marble fiberglass is not the same as that derived from the rotary process. As glass fibers must necessarily dissolve from the fiber ends or the cylindrical exterior, a more highly resistant shell will dramatically impede the dissolution rate. Fibers having such a shell, which are flame attenuated, are also prepared by the rod method or direct melt method. These latter methods involve conveying raw materials, in any form, to an orifice or bushing to form primaries, which are then flame attenuated, as in the pot and marble method.

While flame attenuated fibers exhibit excellent chemical and moisture resistance due to this core/sheath structure, biosolubility of the fibers desirably should be improved. The industry would find useful a fiberglass which exhibited excellent moisture resistance as well as good biosolubility.

SUMMARY OF THE INVENTION

It has now been surprisingly discovered that glass fibers of enhanced biosolubility may be prepared from glass compositions suitable for flame attenuation processing, which have well defined formulations. The fibers have a core/sheath structure where the outer shell (sheath) has a different composition than the core portion (fiber interior), and are prepared from a composition comprising:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1. |

DESCRIPTION OF THE PREFERRED EMBODIMENTS

The glass composition of the glass fibers of the present invention must fall within the following range of composition, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | where $R_2O$ is an alkali metal oxide and RO is an alkaline earth metal oxide. $R_2O$ is preferably $Na_2O$ in most substantial part, while RO may be MgO and/or CaO, preferably both, in a molar ratio of MgO/CaO of 1:3 to 3:1, more preferably 2:3 to 3:2.

At the same time, the HTV and liquidus of the overall composition must be suitable for glass fiber processing. It is preferred that the subject invention glasses have HTV and liquidus which are suitable for production of glass fibers in the pot and marble process. Such glass generally must have an HTV ($10^3$ poise) of 1800° F. to 2100° F., preferably 1900° F. to 2000° F., and exhibit a liquidus which is minimally about 350° F., preferably 425° F., and more preferably 500°

F. or more lower than the HTV. These characteristics are necessary to prepare glass fibers economically on a continuous basis.

It has been found that flame attenuated glass of high biosolubility, while yet maintaining other necessary physical properties such as chemical resistance and moisture resistance, is obtained when the compositions of the present invention are observed.

Preferably, the biosoluble fiberglass of the subject invention has a composition which falls within the following ranges (in mol percent):

| | |
|---|---|
| $SiO_2$ | 66–69.0 |
| $Al_2O_3$ | 0–2.2 |
| RO | 7–16 |
| $R_2O$ | 9–19 |
| $B_2O_3$ | 3–7.1. |

Most preferably, the biosoluble glass fibers of the subject invention have a composition which falls within the following most preferred range:

| | |
|---|---|
| $SiO_2$ | 66–68.25 |
| $Al_2O_3$ | 0–2.2 |
| RO | 7–13 |
| $R_2O$ | 9–18 |
| $B_2O_3$ | 4–7.1. |

With respect to the performance characteristics of the glass fibers of the subject invention, it is preferred that the ratios of C(acid), C(bio) and C(moist), defined as follows:

$$C(acid)=[SiO_2]/([Al_2O_3]+[B_2O_3]+[R_2O]+[RO])$$

$$C(bio)=[SiO_2]/([Al_2O_3])/[B_2O_3]+[R_2O]+[RO])$$

$$C(moist)=([SiO_2]+[Al_2O_3]+[B_2O_3])/([R_2O]+[RO]).$$

are such that C(acid) is greater than or equal to 1.95, and more preferably greater than or equal to 2.00; C(bio) is less than or equal to 2.30, more preferably less than equal to 2.23, most preferably less than or equal to 2.20; and that C(moist) is greater than or equal to 2.40, more preferably less than or equal to 2.50, and most, preferably greater than or equal to 2.60. It is most desirable that C(acid) and C(moist) be as high as possible. For example, C(moist) values of 3.00 or greater are particularly preferred. It should be noted also, that the various C-ratios are independent in the sense that a more preferred glass need not have all "more preferred" C-ratios.

Acid resistance may be measured by battery industry standard tests. For example, a typical test involves addition of 5 grams of nominally 3 $\mu$m diameter fiber in 50 mL of sulfuric acid having a specific gravity of 1.26. Following refluxing for 3 hours, the acid phase may be separated by filtration and analyzed for dissolved metals or other elements.

The procedure used to evaluate biodissolution rate is similar to that described in Law et al. (1990). The procedure consists essentially of leaching a 0.5 gram aliquant of the candidate fibers in a synthetic physiological fluid, known as Gamble's fluid, or synthetic extracellular fluid (SEF) at a temperature of 37° C. and a rate adjusted to achieve a ratio of flow rate to fiber surface area of 0.02 cm/hr to 0.04 cm/hr for a period of up to 1,000 hours duration. Fibers are held in a thin layer between 0.2 $\mu$m polycarbonate filter media backed by plastic support mesh and the entire assembly placed within a polycarbonate sample cell through which the fluid may be percolated. Fluid pH is regulated to 7.4+0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant could be calculated for each fiber type from the relation:

$$k=[d_0\rho(1-(M/M_0)^{0.5}])/2t$$

where k is the dissolution rate constant in SEF, $d_0$ the initial fiber diameter, $\rho$ the initial density of the glass comprising the fiber, $M_0$ the initial mass of the fibers, M the final mass of the fibers ($M/M_0$=the mass fraction remaining), and t the time over which the data was taken. Details of the derivation of this relation is given in Leineweber (1982) and Potter and Mattson (1991). Values for k may be reported in $ng/cm^2/hr$ and preferably exceed a value of 150. Replicate runs on several fibers in a given sample set show that k values are consistent to within 3 percent for a given composition.

Data obtained from this evaluation can be effectively correlated within the sample set chosen—dissolution data used to derive k's were obtained only from experimental samples of uniform (3.0 $\mu$m) diameter and under identical conditions of initial sample surface area per volume of fluid per unit time, and sample permeability. Data was obtained from runs of up to 30 days to obtain an accurate representation of the long term dissolution of the fibers. Preferred biodissolution rate constants in $ng/cm^2/hr$ are greater than 150 $ng/cm^2/hr$, preferably greater than 200 $ng/cm^2/hr$, more preferably greater than 300 $ng/cm^2/hr$, and most preferably greater than 400 $ng/cm^2/hr$.

The glass fibers of the present invention thereby offer one the benefits of a core/sheath structure fiber in terms of moisture resistance, while also enjoying good biodissolution. The glass fibers of the present invention are prepared by a process involving flame attenuation, such as the rod method or pot and marble method, with application to the pot and marble method being most preferred. As mentioned previously, the primaries in a flame attenuation process are exposed to higher temperatures than hot gas attenuation. The primaries are contacted with a sufficiently high temperature to create a shell due to the loss of the more volatile compounds of the glass composition from the outside of the fibers. The resulting fiber has an outside shell which has a different composition than the fiber interior.

The primaries are typically drawn from a multitude of orifices by sets of pull rolls or other relatively slow speed drawing devices that both draw the primaries in a controlled way and also feed the primaries into the flame attenuation zone. Synchronized pairs or sets of rollers are used to draw all primaries at the same speed.

The primaries are drawn through orifices that can be arranged in either a circular array or a rectangular one. The circular array generally occurs in the bottom of a super alloy cylindrical pot, which is used to remelt previously melted glass in marble form. This variation, known as pot and marble, has the cylindrical pot, with rings of orifices in the bottom and an external combustion chamber around the sides of the pot. Marbles at ambient temperature are fed into the pot and are heated using radiant heat from the exterior combustion chamber. The marbles fuse and form a molten pool above the orifices from which the primaries are drawn.

Orifices may also be arranged in rows in the bottom of bushings, which typically are rectangular solid reservoir designs of electrically heated precious metal or super alloy construction. The bushings may be designed to remelt glass in marble or other geometric forms, much as is done in the pot and marble process described above. Alternately, the bushings may be fed with molten glass from small glass melting units which were fed with batch, which is a mixture of the appropriate raw materials for the glass composition desired. The batch is fused in the melting units by the application of either electrical energy or fossil fuel fire burners. After melting and refining, the molten glass bath's temperature is cooled in a controlled way in order to supply the bushings with glass at the appropriate temperature.

While different techniques can be used to create the primaries, the important aspect of the present invention is that the primaries are flame attenuated to create a fiber having an outer shell with a composition different than the interior of the fiber. By employing the compositions of the present invention, it has been found that one can obtain such fibers which exhibit good moisture resistance, but also employ good biodissolution.

Having generally described this invention, a further understanding can be obtained by reference to certain specific examples which are provided herein for purposes of illustration only and are not intended to be limiting unless otherwise specified.

EXAMPLES 1 AND 2

Two glass formulations were processed into marbles for use in pot and marble fiberization, and glass fibers prepared in the conventional pot and marble manner. The formulations, C-ratios, HTV ($10^3$ poise), liquidus, and measured biosolubility are presented in Table 1. The ingredients are in mol percent.

TABLE 1

|  | Example 1 (mol %) | Example 2 (mol %) |
|---|---|---|
| $SiO_2$ | 67.24 | 67.18 |
| $Al_2O_3$ | 1.04 | 1.02 |
| $B_2O_3$ | 6.08 | 5.99 |
| CaO | 4.99 | 4.87 |
| MgO | 5.24 | 5.26 |
| $Na_2O$ | 15.22 | 15.45 |
| $K_2O$ | 0.26 | 0.23 |
| C(acid) | 2.05 | 2.05 |
| C(bio) | 2.15 | 2.14 |
| C(moist) | 2.89 | 2.87 |
| Biosol K(dis) | 350 | 426 |
| HTV | 1972 | 1981 |
| Liquidus | 1435 | <1325 |

The C-ratios indicate that the glasses of Table 1 should exhibit desirable chemical resistance (both acid and moisture) as well as high biodissolution. The high biodissolution is confirmed by actual tests, being in both cases, considerably greater than 300 ng/cm$^2$/hr.

EXAMPLE 3, COMPARATIVE EXAMPLES C3 AND C4

A subject invention glass is compared with two commercial glasses for acid resistance and moisture resistance, respectively. The formulations (mol percent) are as follows.

TABLE 2

|  | Example 3 | Example C3 | Example C4 |
|---|---|---|---|
| $SiO_2$ | 67.28 | 65.36 | 57.53 |
| $Al_2O_3$ | 1.04 | 1.83 | 3.11 |
| $B_2O_3$ | 6.00 | 4.59 | 7.23 |
| CaO | 4.00 | 6.27 | 8.82 |
| $Na_2O$ | 15.20 | 15.56 | 16.24 |
| $K_2O$ | 0.26 | 0.45 | 0.71 |
| $F_2$ | — | 1.43 | — |
| C(acid) | 2.06 | 1.96 | 1.35 |
| C(bio) | 2.16 | 2.14 | 1.54 |
| C(moist) | 2.89 | 2.67 | 2.11 |
| MgO | 5.23 | 4.52 | 6.36 |

The acid resistance of the Example 3 glass was compared with that of Comparative Example C3. It is noted that the Comparative Example C3 glass meets the C-ratio requirements but not the compositional limitations. The results of the acid resistance test are presented below in Table 2a.

TABLE 2a

| Glass Element | Example 3 (ppm) Quantity Dissolved (ppm) | Example C3 (ppm) Quantity Dissolved (ppm) |
|---|---|---|
| Al | 187 | 453 |
| Ca | 2831 | 4110 |
| Mg | 854 | 938 |

To determine moisture resistance, a stress corrosion test is used in which the fibers are stressed by bending in a controlled humidity and temperature test chamber. Fibers which exhibit moisture resistance under these conditions take longer to break. The Example 3 glass was compared to Comparative Example C4 glass, a glass used commercially for building insulation where compression of insulation and storage generates the potential for fiber breakage as a result. After 50 hours, only 12% of the Example 3 glass had broken, while all of the Comparative Example C4 fibers had failed.

EXAMPLES 4–12

Additional glass compositions which fall within the subject invention parameters are presented in the following table.

EXAMPLES 4–12

|  | Example 4 Mol % | Example 5 Mol % | Example 6 Mol % | Example 7 Mol % | Example 8 Mol % | Example 9 Mol % | Example 10 Mol % | Example 11 Mol % | Example 12 Mol % |
|---|---|---|---|---|---|---|---|---|---|
| $SiO_2$ | 67.28 | 67.4 | 66.38 | 66.9 | 65.96 | 68.03 | 69.08 | 67.96 | 68.61 |
| $Al_2O_3$ | 1.04 | 1.03 | 2.35 | 2.37 | 2.33 | 0 | 0 | 0 | 0 |
| $B_2O_3$ | 6.00 | 6.06 | 3.49 | 7.03 | 6.93 | 0.75 | 3.42 | 3.37 | 6.8 |
| $Na_2O$ | 15.20 | 15.25 | 17.13 | 16.08 | 9.25 | 16.08 | 17.58 | 11.63 | 9.83 |
| $K_2O$ | 0.26 | 0.19 | 0.52 | 0 | 0.51 | 0 | 0 | 0 | 0 |
| CaO | 4.99 | 4.83 | 4.87 | 3.76 | 7.42 | 7.43 | 4.89 | 8.46 | 7.28 |
| MgO | 5.23 | 5.23 | 5.27 | 3.87 | 7.63 | 7.71 | 5.02 | 8.58 | 7.48 |

By the term "consisting essentially of" is meant that additional ingredients may be added provided they do not substantially alter the nature of the composition. Substances which cause the biodissolution rate to drop below 150 ng/cm$^2$/hr or which lower the ΔT to a value below 350° F. are substances which do substantially alter the composition. Preferably, the glass compositions are free of iron oxides, lead oxides, fluorine, phosphates (P$_2$O$_5$), zirconia, and other expensive oxides, except as unavoidable impurities.

Having now fully described the invention, it will be apparent to one of ordinary skill in the art that many changes and modifications can be made thereto without departing from the spirit or scope of the invention as set forth herein.

What is claimed is:

1. Glass fibers which have been flame attenuated and comprise an outer shell, and have been prepared from a composition consisting essentially of, in mol percent:

| | |
|---|---|
| SiO$_2$ | 66–69.7 |
| Al$_2$O$_3$ | 0–2.2 |
| RO | 7–18 |
| R$_2$O | 9–20 |
| B$_2$O$_3$ | 0–7.1 | the glass fibers exhibiting biodissolution in excess of 150 ng/cm$^2$/hr.

2. The glass fibers of claim 1, wherein said composition consists essentially of, in mol percent:

| | |
|---|---|
| SiO$_2$ | 66–69.0 |
| Al$_2$O$_3$ | 0–2.2 |
| RO | 7–16 |
| R$_2$O | 9–19 |
| B$_2$O$_3$ | 0–7.1. |

3. The glass fibers of claim 1, wherein said composition consists essentially of, in mol percent:

| | |
|---|---|
| SiO$_2$ | 66–68.25 |
| Al$_2$O$_3$ | 0–2.2 |
| RO | 7–13 |
| R$_2$O | 9–18 |
| B$_2$O$_3$ | 0–7.1. |

4. The glass fibers of claim 1, wherein said fibers have a measured biodissolution rate of greater than 300 ng/cm$^2$/hr.

5. The glass fibers of claim 2, wherein said fibers have a measured biodissolution rate of greater than 300 ng/cm$^2$hr.

6. The glass fibers of claim 3, wherein said fibers have a measured biodissolution rate of greater than 300 ng/cm$^2$/hr.

7. The glass fibers of claim 1, wherein the measured biodissolution of the fibers is greater than about 400 ng/cm$^2$hr.

8. The glass fibers of claim 2, wherein the measured biodissolution of the fibers is greater than about 400 ng/cm$^2$/hr.

9. The glass fibers of claim 3, wherein the measured biodissolution of the fibers is greater than about 400 ng/cm$^2$/hr.

10. The glass fibers of claim 1, wherein the fibers exhibit C(acid) ≧2.00, C(bio) ≦2.23 and C(moist) ≧2.50.

11. The glass fibers of claim 1, wherein the fibers exhibit C(acid) ≧2.00, C(bio) ≦2.20 and C(moist) ≧2.60.

12. The glass fibers of claim 1, wherein the fibers have been prepared by the rod process.

13. Flame attenuated glass fibers, said fibers having an outer shell depleted at least some volatile oxides, said fibers prepared from a glass composition comprising, in mol percent:

| | |
|---|---|
| SiO$_2$ | 66–69.0 |
| Al$_2$O$_3$ | 0–2.2 |
| RO | 7–16 |
| R$_2$O | 9–19 |
| B$_2$O$_3$ | 0–7.1 | characterized by a C (acid) ≧ 2.00, a C(bio) ≦ 2.23, a C(moist) ≧ 2.50, and a biodissolution of greater than about 150 ng/cm$^2$/hr.

14. The fibers of claim 13, wherein said fibers exhibit biodissolution ≧300 ng/cm$^2$/hr.

15. The fibers of claim 13, wherein said glass composition comprises, in mol percent:

| | |
|---|---|
| SiO$_2$ | 66–68.25 |
| Al$_2$O$_3$ | 0–2.2 |
| RO | 7–13 |
| R$_2$O | 9–18 |
| B$_2$O$_3$ | 0–7.1 | said C(acid) ≧2.00, said C(bio) ≦2.20, said C(moist) ≧2.60, and said fibers exhibiting biodissolution ≧300 ng/cm$^2$.

16. A glass fiber prepared by flame attenuation and comprises an outer shell, said fiber being prepared from a glass composition consisting essentially of, in mol percent:

| | |
|---|---|
| SiO$_2$ | 66.5–67.8 |
| Al$_2$O$_3$ | 0.5–1.5 |
| B$_2$O$_3$ | 5.0–7.0 |
| CaO | 3.0–7.0 |
| MgO | 3.0–7.0 |
| Na$_2$O | 14.0–17.0 |
| K$_2$O | 0.1–0.4 | wherein the sum of CaO and MgO is between about 8.0 and 12.0, said glass fiber exhibiting biodissolution greater or equal to about 350 ng/cm$^2$/hr.

17. Flame attenuated glass fibers having an outer shell, prepared from a glass composition comprising, in mol percent:

| | |
|---|---|
| SiO$_2$ | 66–69.7 |
| Al$_2$O$_3$ | 2.2 |
| RO | 18 |
| R$_2$O | 20 |
| B$_2$O$_3$ | 7.1 | where R$_2$O is an alkali metal oxide and RO is an alkaline earth metal oxide, the glass composition having a C(acid) ≧ 1.95, a C(bio) ≦ 2.30, a C(moist) ≧ 2.46, and with the glass fibers exhibiting biodissolution in excess of 150 ng/cm$^2$/hr.

18. The glass fibers of claim 7, wherein said glass composition from which the fibers are prepared comprise, in mol percent:

| | |
|---|---|
| $SiO_2$ | 66–69.0 |
| $Al_2O_3$ | 0–2.2 |
| RO | 7–16 |
| $R_2O$ | 9–19 |
| $B_2O_3$ | 0–7.1. |

19. The glass fibers of claim 17, wherein said glass composition from which the fibers are prepared comprise, in mol percent:

| | |
|---|---|
| $SiO_2$ | 66–68.25 |
| $Al_2O_3$ | 0–2.2 |
| RO | 7–13 |
| $R_2O$ | 9–18 |
| $B_2O_3$ | 0–7.1. |

20. The glass fibers of claim 17, wherein said fibers have a measured biodissolution rate of greater than 300 ng/cm²/hr.

21. The glass fibers of claim 18, wherein said fibers have a measured biodissolution rate of greater than 300 ng/cm²/hr.

22. The glass fibers of claim 18, wherein said fibers have a measured biodissolution rate of greater than 300 ng/cm²/hr.

23. The glass fibers of claim 17, wherein said fibers have a measured biodissolution rate of greater than 400 ng/cm²/hr.

24. The glass fibers of claim 18, wherein said fibers have a measured biodissolution rate of greater than 400 ng/cm²/hr.

25. The glass fibers of claim 19, wherein said fibers have a measured biodissolution rate of greater than 400 ng/cm²/hr.

26. The glass of claim 17, wherein the fibers exhibit C(acid) ≧ 2.00, C(bio) ≦ 2.23 and C(moist) ≧ 2.50.

27. The glass fibers of claim 26, wherein the fibers have a measured biodissolution rate of greater than 300 ng/cm²/hr.

28. The glass fibers of claim 26, wherein the fibers have a measured biodissolution rate of greater than 400 ng/cm²/hr.

29. A method for preparing glass fibers, which comprises contacting a primary with sufficient high temperature to create a loss of at least some volatile compounds of the primaries to thereby create an outside shell which has a different composition than the fiber interior, where the primaries are prepared from a composition comprised of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | the glass fibers exhibiting biodissolution in excess of 150 ng/cm²/hr.

30. The method of claim 29, wherein a pot and marble technique is employed to prepare the glass fibers.

31. The method of claim 29, wherein a direct melt method is employed to prepare the glass fibers.

* * * * *